Patented Nov. 27, 1951

2,576,797

UNITED STATES PATENT OFFICE 2,576,797

PENETRATING WOOD-FINISHING COMPOSITION

Frank H. Lyons, Memphis, Tenn., assignor to E. L. Bruce Co., Memphis, Tenn., a corporation of Delaware No Drawing. Application June 19, 1950, Serial No. 169,073

21 Claims. (Cl. 106—172)

This application is a continuation-in-part of my co-pending and abandoned application Serial No. 641,174, filed January 14, 1946, and relates to a new and improved wood finish composition. The composition is particularly well adapted for finishing the so-called hard woods, such as oak and the like, that are extensively used for flooring. More particularly the invention has to do with improvements in the so-called penetrating seal type of wood finishing compositions for use in the factory finishing of hard wood flooring in either strip or block form.

In the factory finishing of hard wood flooring according to the disclosure in Gray et al., U. S. Patent No. 2,341,161, issued February 8, 1944, a penetrating seal type of finish composition is applied particularly to open pore wood, e. g. red oak flooring, as a mixture of penetrating finish material, together with a filler material. After application the composition is subjected to brushing, infra-red heating, further brushing (while heated), rubbing-in, polishing, and buffing operations.

It has been found in practice that the penetrating seal finish materials and particularly the film-forming resin, which is highly soluble in the solvent used, and other film-forming materials, penetrate into the wood fibers along with the solvent. These binder substances become evenly and somewhat thinly distributed beneath the wood surface, where they are oxidized and/or polymerized under the action of the infra-red heat and other treatments, as disclosed in the above referred to patent to Gray et al.

When a pore filler material is included in the composition, it has been found that the soluble resinous materials do not remain in the surface pores in sufficient amount to bind and retain the filler material in some of the surface pores of the more open grained flooring, so as to withstand the subsequent rubbing-in, brushing and buffing operations. The result has been that wood finished as described in the aforementioned Gray et al patent is found to have some unfilled or incompletely filled surface pores.

It has been discovered that a superior wearing surface is formed with compositions containing no wood filler materials if a plurality of film-forming resins and cellulose compounds are present in the coating composition, one of which film-forming substances is adapted to form a non-penetrating seal while the other penetrates substantially beneath the surface of the wood to seal the pores.

Accordingly, it is a primary object of the present invention to compound a penetrating seal finish composition in order to obtain a continous film, and adequate surface adhesion of the filler material in the surface pores when filler is used. Such compounding is effected by inclusion in the composition of a binder material which is less soluble in the petroleum naphtha than the other included binders and, therefore, will be less penetrating. Hence, a significant quantity of such binder material will remain in the surface pores where it is effective to form a concentration of film-forming material and serves to bind the filler material therein, when filler is included.

It is a further object to include non-penetrating film-forming substances in a penetrating seal type of finish composition with or without a wood filler.

According to the present invention, applicant produces a combined penetrating and non-penetrating wood seal finishing composition by a critical selection of several film-forming substances of the resinous polymer or ester type, each soluble preferentially in different solvents blended to the critical degree that one of the resins is in the state of incipient precipitation, that is, it has reached its saturation point with respect to the combined solvents. The film-forming substance in this state of incipient precipitation is substantially non-penertating.

Soluble, plasticizable, and/or dispersable film-forming materials of the ester or polymer type may be made substantially non-penetrating by proper selections of the film-forming substance with respect to its solubility in the volatile solvent constituent, such as petroleum naphtha, of the penetrating seal composition. By the same principle, where a certain film-forming substance is desirably made non-penetrating, slight modification of the penetrating seal solvent, to lower its tolerance for the particular film-forming substance, will allow the same to function in accordance with this invention, as a non-penetrating film-forming constituent.

Various film-forming substances are useful herein and can be properly modified to have non-penetrating characteristics by proper selection of the solvent therefor. Thus, a non-penetrating film-forming substance may be a typical resin formed by polymerization, or an ester of a high molecular weight natural compound, such as cellulose. For example, I may use any of the cellulose ethers or esters, such as ethyl cellulose, nitrocellulose, cellulose acetate, butyl cellulose, cellulose acetate butyrate, benzyl cellulose, cellulose acetate propionate, chlorinated rubber (both natural and synthetic), recyclized natural rubber, copolymers of vinylidene chloride and acrylonitrile, and dispersions of phenolformaldehyde resins, or other film-forming agents common in the coating art recognized to have preferential solubility in certain generally polar type solvents and indifferent or low solubility in petroleum naphtha. These generally will be dissolved in organic solvents of the polar type, the solvent being selected to be a good solvent for the particular non-penetrating resin selected. It is possible for two or more resins as blends of the above mentioned type to be used, in which case a single solvent or blend of solvents, primarily selected to be good solvents for the blended resins will be used. A further criterion for the solvent is not only good solubility for the non-penetrating resin but also moderate or poor solubility for the penetrating type resin. Organic solvents may be esters, alcohols, ketones, ethers, halogenated hydrocarbons, and aromatic hydrocarbons of the volatile spirit solvent type. Useful examples thereof are listed:

| Esters | Ethers |
|---|---|
| Ethyl acetate | Ethylene glycol monoethyl ether |
| Butyl acetate | |
| Propyl acetate | Ethylene glycol monobutyl ether |
| Ethyl formate | |
| Butyl lactate | |

| Aromatics | Ketones |
|---|---|
| Benzene | Acetone |
| Toluene | Methyl ethyl ketone |
| Xylene | Hexone |
| | Methyl isobutyl ketone |

| Alcohols | Chlorinated hydrocarbons |
|---|---|
| Methanol | |
| Ethanol | Ethylene dichloride |
| Butanol | Carbon tetrachloride |
| Propanol | Trichloroethylene |
| Isopropanol | |
| Benzyl alcohol | |

The solvents will be generally selected from the consideration of flashpoint, in view of the high temperature treatment in the wood finishing process, in addition to the critical feature of control tolerance for the penetrating resin solution.

The penetrating composition is that typically heretofore used in the art and consists of a typically naphtha soluble film-forming substance such as the various varnish resins and gums. The natural gums and resins such as rosin, limed rosin, copal, ester gum, etc., easily soluble in high flashpoint petroleum naphtha may be used, as well as other typical penetrating varnish bases of a synthetic character; for example, drying oil modified alkyd resins, such as reaction products of aliphatic polyhydric alcohols, i. e. glycerol or pentaerythritol with polybasic acids typically phthalic anhydrid modified with linseed oil or China wood oil or drying oil fatty acids thereof.

Both solutions of non-penetrating and penetrating film-forming substances will then be blended in quantity, and critically adjusted so that the non-penetrating film-forming substance just begins to precipitate out, the mixture showing a slight cloud at this point. After such critical adjustment, when the composition is applied to wood for the finishing thereof, the penetrating composition will tend to be drawn into the pores of the wood, as usual, and the non-penetrating component, in a state of incipient precipitation, will tend to remain as a film on the surface of the wood. Such surface film, as indicated above, tends to fill irregularities in the pores, particularly in a close-pored wood, and for large open-pored wood, acts as a desirable binder substance to smoothly adhere the filler material in the surface pores when filler material is used.

Thus it will be understood that filler materials will be added to the composition particularly where open pored woods are to be treated. Various modifying components known in coating compositions, such as drying oils, dryers, pigments, etc., may be added. The absolute quantity of either type of resin used for penetrating and non-penetrating purposes will generally vary from 8 to 22% but such absolute quantity is not in itself critical. The critical feature is the adjustment of one type of resin solution with respect to the other, whereby the non-penetrating film-forming substance is in the state of incipient precipitation. In the formulation of the composition, a solvent for the non-penetrating film-forming substance is selected, as noted above, and a solution comprising 8 to 22% of the non-penetrating film-forming substance in the solvent is made up. This solution is then mixed with a typically formed penetrating seal composition in which the solvent is petroleum naphtha, one solution diluting the other until precipitation just begins, that is, one resin begins to be thrown out of solution.

*Example I*

A typical formulation is made by dissolving 10% by weight of ethyl cellulose (10 centipoise) with 90% by weight of butanol. Such solution is added to a penetrating seal composition with or without filler, until incipient precipitation takes place. Such composition may have the following formula:

| | | |
|---|---|---|
| 4 hour linseed oil | pounds | 430 |
| Resins (ester gum, limed resin, phenolformalde, copals) | pounds | 382 |
| Driers (solutions of lead, manganese and cobalt) | gallons | 9 |
| 10% ethyl cellulose-butanol solution | do | 35 |
| Naphtha | do | 300 |
| Zinc stearate | pounds | 45½ |
| Raw sienna | do | 45½ |
| Burnt umber | do | 7 |
| Litharge | do | 10½ |
| Silex (finely ground silica) | do | 462 |

*Example II*

| | | |
|---|---|---|
| Linseed oil | pounds | 92 |
| China-wood oil | do | 30 |
| Pentaerythritol ester of abietic acid | do | 105 |
| Phenolformaldehyde resin | do | 35 |
| Zinc stearate | do | 1 |
| Soluble lead and manganese driers | gallons | 2 |
| Petroleum naphtha | do | 72 |
| 10% solution of copolymer of vinylidene chloride and acrylonitrile in methyl isobutyl ketone | gallons | 10 |

In this formula the linseed oil, China-wood oil, pentaerythritol resin, and phenolformaldehyde resin can be varied over wide limits with the modification that greater or lesser quantities of the copolymers of vinylidene chloride and acrylonitrile will be used and adjusted in each case to the critical point of incipient precipitation. Similarly, this resin may be replaced by the various cellulose esters and ethers, halogenated rubber, etc.

Example III (In the formula of Example II the following composition is substituted for the penetrating seal composition.)

A 60% solution in petroleum solvent of an alkyd resin where pentaerythritol is the polyhydric alcohol and where the solid resin contains 24% phthalic anhydride and 60% drying oil fatty acids with a final acid number of from 4-8 _____ pounds__ 780
Soluble driers _____ gallons__ 2
Petroleum naphtha _____ do____ 34

Further addition of a non-penetrating resin may be used in substitution for the non-penetrating resin of Example II, as follows:

50% solid dispersion of an insoluble completely polymerized phenolformaldehyde resin where aromatic solvent and alcohol is used as the continuous phase __gallons__ 16

Various alkyd resins may be substituted for the particular resin given in this formula, for example glycerol may be substituted wholly or in part for the pentaerythritol.

Example IV

Neither of the formulas of Examples II and III contains pigment or filler. Where the formula is to contain pigment and filler, the following composition may be added to 100 gallons of either of Examples II and III:

| | Pounds |
|---|---|
| Titanium dioxide | 2 |
| Burnt umber | 5 |
| Silex | 74 |
| Asbestine | 7 |

Example V

Alternatively, pigmentation and filler may be added according to the following formula:

| | Pounds |
|---|---|
| Raw sienna | 21 |
| Burnt umber | 15 |
| Burnt Italian sienna | 10 |
| Silex | 70 |
| Litharge | 1 |

It will be apparent that such compositions may be varied according to known practices in the art and such modifications, except as limited by the claims, are to be included herein.

I claim:

1. A non-aqueous penetrating seal wood finishing composition comprising: the combination of two coating compositions, the first coating composition composed of a penetrating seal finish composition comprising a resin dissolved in petroleum naphtha; and the second composition comprising an organic film-forming substance dissolved in a polar solvent, the film-forming substance of the second coating composition having limited solubility in the petroleum naphtha solvent used for the resin, the two compositions being blended to a homogeneous solution critically adjusted in proportions so that the film-forming substance is in the state of incipient precipitation.

2. A non-aqueous penetrating seal wood finishing composition comprising: the combination of two coating compositions, the first coating composition composed of a penetrating seal finish composition comprising a resin dissolved in petroleum naphtha; and the second coating composition comprising an organic film-forming substance dissolved in a polar solvent, the film-forming substance of the second coating composition having limited solubility in the petroleum naphtha solvent used for the resin, the two compositions being blended to a homogeneous solution critically adjusted in proportions so that the film-forming substance is in the state of incipient precipitation, the two blended compositions having further added thereto a wood filler material.

3. A non-aqueous penetrating seal wood finishing composition comprising: a mixture of a first solution composed of a natural resin, homogeneously dissolved in petroleum naphtha as to be penetratively carried into wood upon application thereto; and a second solution of an organic film-forming substance having limited solubility in petroleum naphtha dissolved in a volatile polar solvent, said second solution being homogeneously mixed with the first solution in such proportions that the film-forming compound therein having limited solubility in petroleum naphtha is saturated with respect to the combined solvents and is in a state of incipient precipitation, whereby said film-forming substance will not penetrate beneath the surface of wood to the same depth as will the resin dissolved in petroleum naphtha comprising the first solution.

4. A non-aqueous penetrating seal wood finishing composition comprising: a mixture of a first solution composed of an ester of an acid-containing natural resin homogeneously dissolved in petroleum naphtha as to be penetratively carried into porous woods upon application thereto; and a second solution of an organic film-forming substance having limited solubility in petroleum naphtha dissolved in a volatile polar solvent, said second solution being homogeneously mixed with the first solution in such proportions that the film-forming compound therein having limited solubility in petroleum naphtha is saturated with respect to the combined solvents and is in a state of incipient precipitation, whereby said film-forming substance will not penetrate beneath the surface of wood to the same depth as will the resin dissolved in petroleum naphtha comprising the first solution.

5. A non-aqueous wood finishing composition comprising: a mixture of a first solution composed of a drying oil modified alkyd resin, homogeneously dissolved in petroleum naphtha as to be penetratively carried into porous woods upon application thereto; and a second solution of an organic film-forming substance having limited solubility in petroleum naphtha dissolved in a voltatile polar solvent, said second solution being homogeneously mixed with the first solution in such proportions that the film-forming compound therein having limited solubility in petroleum naphtha is saturated with respect to the combined solvents and is in a state of incipient precipitation, whereby said film-forming substance will not penetrate beneath the surface of wood to the same depth as will the resin dissolved in naphtha comprising the first solution.

6. A non-aqueous penetrating seal wood finishing composition comprising: a mixture of a first solution composed of a resin dissolved in petroleum naphtha; and a second solution comprising a film-forming cellulose compound containing no elements other than carbon, hydrogen, oxygen and nitrogen dissolved in a polar aliphatic volatile solvent, said second solution being homogeneously mixed with the first solution in such proportions that the film-forming cellulose compound therein is saturated with respect to the combined solvents and is in a state of incipient precipitation, whereby said film-forming cellulose compound will not penetrate beneath the surface of the wood to the same depth as will the resin dissolved in petroleum naphtha comprising the first solution.

7. A non-aqueous penetrating seal wood finishing composition comprising: a mixture of a first solution composed of a natural resin dissolved in petroleum naphtha; and a second solution comprising a film-forming cellulose compound containing no elements other than carbon, hydrogen, oxygen and nitrogen dissolved in a polar aliphatic volatile solvent, said second solution being homogeneously mixed with the first solution in such proportions that the film-forming cellulose compound therein is saturated with respect to the combined solvents and is in a state of incipient precipitation, whereby said film-forming cellulose compound will not penetrate beneath the surface of the wood to the same depth as will the resin dissolved in petroleum naphtha comprising the first solution.

8. A non-aqueous penetrating seal wood finishing composition comprising: a mixture of a first solution composed of a drying oil modified alkyd resin dissolved in petroleum naphtha; and a second solution comprising a film-forming cellulose compound containing no elements other than carbon, hydrogen, oxygen and nitrogen dissolved in a polar aliphatic volatile solvent, said second solution being homogeneously mixed with the first solution in such proportions that the film-forming cellulose compound therein is saturated with respect to the combined solvents and is in a state of incipient precipitation, whereby said film-forming cellulose compound will not penetrate beneath the surface of the wood to the same depth as will the resin dissolved in petroleum naphtha comprising the first solution.

9. A non-aqueous penetrating seal wood finishing composition comprising: a mixture of a first solution composed of a resin homogeneously dissolved in petroleum naphtha as to be penetratively carried into wood upon application thereto; and a second solution comprising ethyl cellulose dissolved in a polar aliphatic volatile solvent, said second solution being homogeneously mixed with the first solution in such proportions that the ethyl cellulose therein is saturated with respect to the combined solvents and is in a state of incipient precipitation, whereby the ethyl cellulose will not penetrate beneath the surface of wood to the same depth as will the resin dissolved in petroleum naphtha comprising the first solution.

10. A non-aqueous penetrating seal wood finishing composition comprising: a mixture of a first solution composed of a resin homogeneously dissolved in petroleum naphtha as to be penetratively carried into wood upon application thereto; and a second solution comprising cellulose acetate dissolved in a polar aliphatic volatile solvent, said second solution being homogeneously mixed with the first solution in such proportions that the cellulose acetate therein is saturated with respect to the combined solvents and is in a state of incipient precipitation, whereby the cellulose acetate will not penetrate beneath the surface of the wood to the same degree as will the resin dissolved in petroleum naphtha comprising the first solution.

11. A non-aqueous penetrating seal wood finishing composition comprising: a mixture of a first solution composed of a resin homogeneously dissolved in petroleum naphtha as to be penetratively carried into wood upon application thereto; and a second solution comprising nitro cellulose dissolved in a polar aliphatic volatile solvent, said second solution being homogeneously mixed with the first solution in such proportions that the nitro cellulose therein is saturated with respect to the combined solvents and is in a state of incipient precipitation, whereby the nitro cellulose will not penetrate beneath the surface of the wood to the same degree as will the resin dissolved in petroleum naphtha comprising the first solution.

12. A non-aqueous penetrating seal wood finishing composition comprising: a mixture of a first solution composed of a resin homogeneously dissolved in petroleum naphtha as to be penetratively carried into wood upon application thereto; and a second solution comprising chlorinated rubber dissolved in a polar aliphatic volatile solvent, said second solution being homogeneously mixed with the first solution in such proportions that the chlorinated rubber therein is saturated with respect to the combined solvents and is in a state of incipient precipitation, whereby the chlorinated rubber will not penetrate beneath the surface of the wood to the same depth as will the resin dissolved in petroleum naphtha comprising the first solution.

13. A non-aqueous penetrating seal wood finishing composition comprising: a mixture of a first solution composed of a resin homogeneously dissolved in petroleum naphtha as to be penetratively carried into porous woods upon application thereto; and a second solution comprising a copolymer of vinylidene chloride and acrylonitrile dissolved in a polar aliphatic volatile solvent, said second solution being homogeneously mixed with the first solution in such proportions that the vinylidene chloride and acrylonitrile copolymer therein is saturated with respect to the combined solvents and is in a state of incipient precipitation, whereby the vinylidene chloride and acrylonitrile copolymer will not penetrate beneath the surface of the wood to the same depth as will the resin dissolved in petroleum naphtha comprising the first solution.

14. A non-aqueous penetrating seal wood finishing composition comprising a wood filler suspended in a mixture of a first solution composed of a resin homogeneously dissolved in petroleum hydrocarbon naphtha as to be penetratively carried into porous woods upon application thereto and a second solution composed of a cellulose compound selected from the group consisting of ethyl cellulose, cellulose acetate, cellulose acetate butyrate, cellulose acetate propionate, cellulose nitrate and benzyl cellulose, dissolved in a volatile polar aliphatic solvent said second solution being homogeneously mixed with the first solution in such proportions that the cellulose compounds normally insoluble in hydrocarbon naphtha are saturated with respect to the combined solvents, and in a state of incipient precipitation, whereby said cellulose compounds will not penetrate beneath the surface of the wood to the same degree which the naphtha soluble resins will penetrate and the filler material is bonded in the surface pores substantially by the cellulose compound.

15. The composition defined in claim 14 additionally including a drying oil and a dryer.

16. The composition defined in claim 14 wherein the cellulose compound is ethyl cellulose.

17. The composition as defined in claim 14 wherein the cellulose compound is cellulose acetate.

18. The composition as defined in claim 14 wherein the cellulose compound is cellulose nitrate.

19. The composition of claim 2 additionally including a drying oil and a drier.

20. The composition of claim 5 additionally including a mineral pore filler substance, a drying oil and a drier homogeneously suspended and dissolved therein.

21. A non-aqueous wood finishing composition comprising a mixture of a first solution composed of a soap of an acid-containing natural resin homogeneously dissolved in petroleum naphtha as to be penetratively carried into porous woods upon application thereto; and a second solution of an organic film-forming substance having limited solubility in petroleum naphtha dissolved in a volatile polar solvent, said second solution being homogeneously mixed with the first solution in such proportions that the film-forming compound therein having limited solubility in petroleum naphtha is saturated with respect to the combined solvents and is in a state of incipient precipitation, whereby said film-forming substance will not penetrate beneath the surface of the wood to the same depth as will the resin dissolved in naphtha comprising the first solution.

FRANK H. LYONS.

REFERENCES CITED

The following references are of record in the file of this patent:

UNITED STATES PATENTS

| Number | Name | Date |
|---|---|---|
| 1,399,838 | Abbey | Dec. 13, 1921 |
| 1,435,031 | Taylor | Nov. 7, 1922 |
| 1,800,120 | Vivas | Apr. 7, 1931 |
| 1,828,449 | Seymour | Oct. 28, 1931 |
| 1,838,618 | Griffiths | Dec. 29, 1931 |
| 1,885,780 | Stille | Nov. 1, 1932 |
| 1,902,256 | Moss | Mar. 21, 1933 |
| 1,936,989 | Peters | Nov. 28, 1933 |
| 2,061,509 | Laney | Nov. 17, 1936 |
| 2,075,376 | Ubben | Mar. 30, 1937 |
| 2,138,211 | Schnorf | Nov. 29, 1938 |
| 2,254,072 | Jenkins | Aug. 26, 1941 |
| 2,266,159 | Bucy | Dec. 16, 1941 |
| 2,316,752 | Atkinson | Apr. 20, 1943 |
| 2,328,566 | Mathews | Sept. 7, 1943 |
| 2,356,025 | Bergamini | Aug. 15, 1944 |
| 2,474,567 | Applegate | Sept. 7, 1949 |

FOREIGN PATENTS

| Number | Country | Date |
|---|---|---|
| 211,520 | Germany | July 6, 1909 |
| 605,225 | Germany | Nov. 7, 1934 |